US011333188B2

(12) United States Patent
Perez Ruiz et al.

(10) Patent No.: US 11,333,188 B2
(45) Date of Patent: May 17, 2022

(54) TWIST SELF-RETAINING LOCATOR MEMBER

(71) Applicant: GM GLOBAL TECHNOLOGY OPERATIONS LLC, Detroit, MI (US)

(72) Inventors: Alejandro Perez Ruiz, Warren, MI (US); Matthew M. Kunz, Washington, MI (US); Darren M. Van Houzen, Shelby Township, MI (US); James K. Platt, Flushing, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 215 days.

(21) Appl. No.: 16/695,882

(22) Filed: Nov. 26, 2019

(65) Prior Publication Data

US 2021/0156410 A1    May 27, 2021

(51) Int. Cl.
*F16B 21/02* (2006.01)
*F16B 21/08* (2006.01)
*B60R 13/04* (2006.01)

(52) U.S. Cl.
CPC .............. *F16B 21/02* (2013.01); *B60R 13/04* (2013.01); *F16B 21/082* (2013.01)

(58) Field of Classification Search
CPC ....... F16B 21/02; F16B 21/086; F16B 21/082
USPC .................................. 411/508, 349, 549, 553
See application file for complete search history.

(56) References Cited

U.S. PATENT DOCUMENTS

| 2,684,515 | A | * | 7/1954 | Zahodiakin | F16B 5/10 411/549 |
| 3,179,367 | A | * | 4/1965 | Rapata | F16B 12/2027 248/239 |
| 3,298,071 | A | * | 1/1967 | Flora | F16B 21/02 24/297 |
| 3,764,729 | A | * | 10/1973 | Kowalewski | H05K 7/142 174/138 D |
| 4,114,339 | A | * | 9/1978 | Ito | F16B 5/065 24/618 |
| 4,393,561 | A | * | 7/1983 | Yuda | B60K 11/08 24/297 |
| 4,770,586 | A | * | 9/1988 | Osterland | F16B 21/02 16/86 A |
| 6,237,970 | B1 | * | 5/2001 | Joannou | E05B 65/006 292/241 |
| 7,600,724 | B2 | * | 10/2009 | Nelson | F16B 21/02 248/68.1 |
| 7,753,634 | B2 | * | 7/2010 | Nakazato | F16B 21/02 411/553 |

(Continued)

FOREIGN PATENT DOCUMENTS

CN        101438065 A    5/2009
CN        101617132 A    12/2009
(Continued)

*Primary Examiner* — Flemming Saether
(74) *Attorney, Agent, or Firm* — Quinn IP Law (57) ABSTRACT

An exemplary self-retaining locator member includes a body having a first surface and a second surface opposite the first surface. The body includes an engagement area formed in the first surface, an alignment member extending from the first surface, the alignment member including a retention tab, an extension member extending from the second surface, a retention member extending from the extension member, and a stopping member extending from the second surface.

18 Claims, 6 Drawing Sheets

(56) References Cited

U.S. PATENT DOCUMENTS 10,701,467 B2 * 6/2020 Kumakura ................ F16B 5/07

FOREIGN PATENT DOCUMENTS

| CN | 204175753 U | 2/2015 |
| CN | 204184275 U | 3/2015 |
| CN | 108825601 A | 11/2018 |
| CN | 109751301 A | 5/2019 |

* cited by examiner

TWIST SELF-RETAINING LOCATOR MEMBER

Components, in particular vehicular components used in automotive vehicles, which are to be mated together in a manufacturing process may be mutually located with respect to each other by alignment features that are oversized holes. Such alignment features are typically sized to provide spacing to freely move the components relative to one another to align them without creating an interference therebetween that would hinder the manufacturing process. However, significant positional variation can occur between mated components having this alignment feature, which may contribute to the presence of undesirably large variation in their alignment, particularly with regard to gaps and/or spacing. Furthermore, current interfaces between plastic and sheet metal components rely on disposable fasteners that are replaced during service.

SUMMARY

Embodiments according to the present disclosure provide a number of advantages. For example, embodiments according to the present disclosure enable the use of elastic averaging to mate a plastic component to a sheet metal component using a self-retaining, reusable plastic fastener. The interface between the mating plastic parts provides an interface for coupling the components with the benefits of elastic averaging including, for example and without limitation, improved perceived quality, location of mating parts, reduction of noise and vibration, and packaging efficiencies.

In one aspect of the present disclosure, a self-retaining locator member includes a body having a first surface and a second surface opposite the first surface. The body includes an engagement area formed in the first surface, a first alignment member extending from the first surface and a second alignment member extending from the first surface, each of the first and second alignment members including a retention tab. The first and second alignment members at least partially encircle the engagement area. The body also includes an extension member extending from the second surface, a first retention member extending from the extension member on a first side and a second retention member extending from the extension member on a second side opposite the first side, and a first stopping member extending from the second surface and a second stopping member extending from the second surface. The first and second stopping members are located on opposite sides of the extension member and the first and second stopping members and the first and second retention members are evenly distributed around the extension member.

In some aspects, the body is elongated along a longitudinal axis.

In some aspects, the first and second surfaces of the body are connected by and adjacent to an angled surface defining a lip.

In some aspects, the engagement area is configured to receive a tool to facilitate rotation of the self-retaining locator member.

In some aspects, rotation of the self-retaining locator member facilitates deformation of the body as the body rotates from a first position to a second position.

In some aspects, the first position is an insertion position and the second position is an installed position.

In some aspects, the first and second alignment members are curved members.

In some aspects, the first and second retention members are rectangular extensions oriented at an oblique angle with respect to the second surface of the body such that one end of each of the first and second retention members is closer to the second surface of the body than the other, opposite end of each of the first and second retention members.

In some aspects, the extension member is a cylindrical extension and the first and second retention members extend from an exterior surface of the extension member such that each of the first and second retention members is spaced apart from the second surface.

In some aspects, the first and second stopping members are raised, U-shaped members.

In another aspect of the present disclosure, an automotive vehicle includes a frame including an aperture, a self-retaining locator member arranged in the aperture, the self-retaining locator member including a body defining a longitudinal axis and including a first alignment member and a second alignment member spaced apart from each other, each of the first and second alignment members including a retention tab, and a vehicle component including a first edge defining a first opening configured to receive and engage the first alignment member and a second edge defining a second opening configured to receive and engage the second alignment member to couple together the vehicle component and the self-retaining locator member. Each of the first and second alignment members is an elastically deformable material such that when the vehicle component is coupled to the self-retaining locator member, the first and second alignment members elastically deform to facilitate alignment of the vehicle component and the frame in a desired orientation.

In some aspects, the body of the self-retaining locator member includes a first surface and a second surface opposite the first surface, the first and second alignment members extending from the first surface of the body; an extension member extending from the second surface; a first retention member extending from the extension member on a first side and a second retention member extending from the extension member on a second side opposite the first side; and a first stopping member extending from the second surface and a second stopping member extending from the second surface, the first and second stopping members located on opposite sides of the extension member.

In some aspects, the body is elongated along the longitudinal axis and the first and second surfaces of the body are connected by and adjacent to an angled surface defining a lip.

In some aspects, rotation of the self-retaining locator member within the aperture of the frame facilitates deformation of the body from a first position to a second position, wherein the first position is an insertion position and the second position is an installed position In some aspects, the first and second alignment members are curved members.

In some aspects, the first and second retention members are rectangular extensions oriented at an oblique angle with respect to the second surface of the body such that one end of each of the first and second retention members is closer to the second surface of the body than the other, opposite end of each of the first and second retention members and the first and second retention members are spaced apart from the second surface of the body.

In some aspects, the first and second stopping members are raised, U-shaped members.

In another aspect of the present disclosure, a method of manufacturing a self-retaining locator member includes the steps of forming a body having a first surface and a second surface opposite the first surface, the body including an engagement area formed in the first surface, forming a first alignment member extending from the first surface and a second alignment member extending from the first surface, each of the first and second alignment members including a retention tab, the first and second alignment members at least partially encircling the engagement area, forming an extension member extending from the second surface, forming a retention member extending from the extension member, and forming a stopping member extending from the second surface. The first and second stopping members and the first and second retention members are evenly distributed around the extension member.

In some aspects, rotation of the self-retaining locator member facilitates deformation of the body as the body rotates from a first position to a second position.

In some aspects, rotation of the body from the first position to the second position results in elastic deformation of the body to an elastically averaged final configuration.

BRIEF DESCRIPTION OF THE DRAWINGS

The present disclosure will be described in conjunction with the following figures, wherein like numerals denote like elements.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first," "second," "third," and so on may be used to describe separate components. Such terminology may include the words specifically mentioned above derivatives thereof, and words of similar import.

The following description is merely exemplary in nature and is not intended to limit the present disclosure, its application or uses. For example, the embodiments shown are applicable to vehicle components, but the system disclosed herein may be used with any suitable components to provide securement and elastic averaging for precision location and alignment of all manner of mating components and component applications, including many industrial, consumer product (e.g., consumer electronics, various appliances and the like), transportation, energy, and aerospace applications, and particularly including many other types of vehicular components and applications, such as various interior, exterior, electrical and under hood vehicular components and applications. It should be understood that throughout the drawings, corresponding reference numerals indicate like or corresponding parts and features.

As used herein, the term "elastically deformable" refers to components, or portions of components, including component features, comprising materials having a generally elastic deformation characteristic, wherein the material is configured to undergo a resiliently reversible change in its shape, size, or both, in response to the application of a force. The force causing the resiliently reversible or elastic deformation of the material may include a tensile, compressive, shear, bending or torsional force, or various combinations of these forces. The elastically deformable materials may exhibit linear elastic deformation, for example that described according to Hooke's law, or non-linear elastic deformation.

Elastic averaging provides elastic deformation of the interface(s) between mated components, wherein the average deformation provides a precise alignment, the manufacturing positional variance being minimized to $X_{min}$, defined by $X_{min}=X/\sqrt{N}$, wherein X is the manufacturing positional variance of the locating features of the mated components and N is the number of features inserted. To obtain elastic averaging, an elastically deformable component is configured to have at least one feature and its contact surface(s) that is over-constrained and provides an interference fit with a mating feature of another component and its contact surface(s). The over-constrained condition and interference fit resiliently reversibly (elastically) deforms at least one of the at least one feature or the mating feature, or both features. The resiliently reversible nature of these features of the components allows repeatable insertion and withdrawal of the components that facilitates their assembly and disassembly. Positional variance of the components may result in varying forces being applied over regions of the contact surfaces that are over-constrained and engaged during insertion of the component in an interference condition. It is to be appreciated that a single inserted component may be elastically averaged with respect to a length of the perimeter of the component.

Any suitable elastically deformable material may be used for the mating components and alignment features disclosed herein and discussed further below, particularly those materials that are elastically deformable when formed into the features described herein. This includes various metals, polymers, ceramics, inorganic materials, or glasses, or composites of any of the aforementioned materials, or any other combinations thereof suitable for a purpose disclosed herein. Many composite materials are envisioned, including various filled polymers, including glass, ceramic, metal and inorganic material filled polymers, particularly glass, metal, ceramic, inorganic or carbon fiber filled polymers. Any suitable filler morphology may be employed, including all shapes and sizes of particulates or fibers. More particularly any suitable type of fiber may be used, including continuous and discontinuous fibers, woven and unwoven cloths, felts or tows, or a combination thereof. Any suitable metal may be used, including various grades and alloys of steel, cast iron, aluminum, magnesium or titanium, or composites thereof, or any other combinations thereof. Polymers may include both thermoplastic polymers or thermoset polymers, or composites thereof, or any other combinations thereof, including a wide variety of co-polymers and polymer blends. In one embodiment, a preferred plastic material is one having elastic properties so as to deform elastically without fracture, as for example, a material comprising an acrylonitrile butadiene styrene (ABS) polymer, and more particularly a polycarbonate ABS polymer blend (PC/ABS). The material may be in any form and formed or manufactured by any suitable process, including stamped or formed metal, composite or other sheets, forgings, extruded parts, pressed parts, castings, or molded parts and the like, to include the deformable features described herein. The elastically deformable alignment features and associated component may be formed in any suitable manner. For example, the elastically deformable alignment features and the associated component may be integrally formed, or they may be formed entirely separately and subsequently attached together. When integrally formed, they may be formed as a single part from a plastic injection molding machine, for example. When formed separately, they may be formed from different materials to provide a predetermined elastic response characteristic, for example. The material, or materials, may be selected to provide a predetermined elastic response characteristic of any or all of the elastically deformable alignment features, the associated component, or the mating component. The predetermined elastic response characteristic may include, for example, a predetermined elastic modulus.

As used herein, the term vehicle is not limited to just an automobile, truck, van or sport utility vehicle, but includes any self-propelled or towed conveyance suitable for transporting a burden.

Currently, elastic averaging cannot be used for serviceable interfaces between plastic and sheet metal components. Embodiments of the present disclosure include a self-retaining, deformable plastic locator member that is inserted into an aperture in a sheet metal component, twisted into place, and used to attach a plastic component with the benefit of elastic averaging features in the interface between the plastic locator member and the plastic component. The self-retaining plastic locator member is used to position, secure, and locate a plastic component to a sheet metal component.

Figure 1:
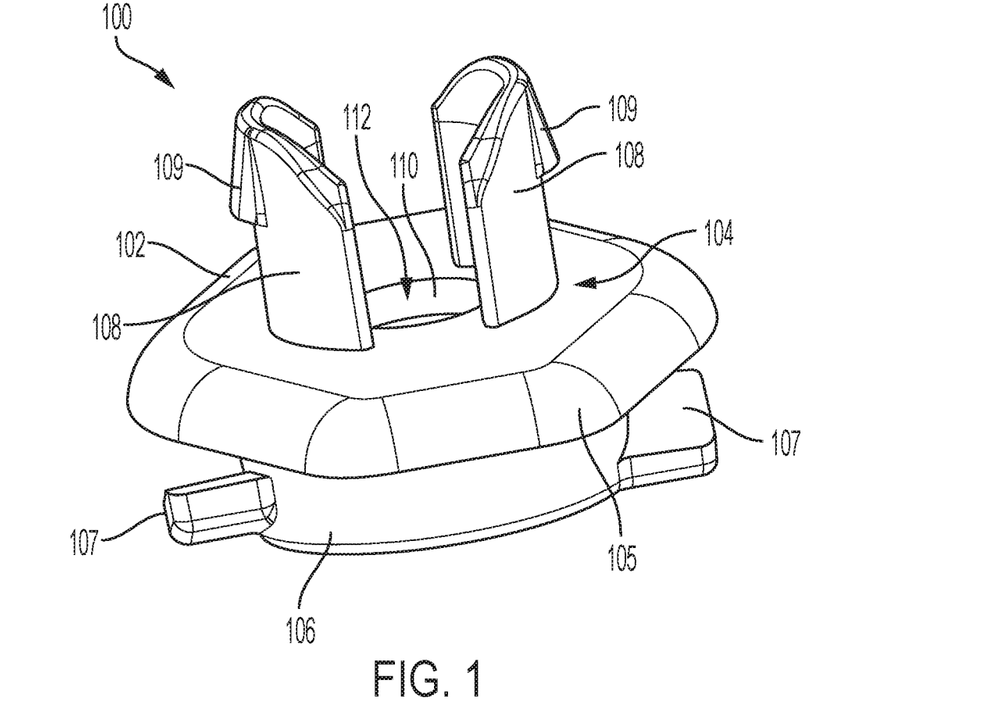
FIG. 1 schematically illustrates a top perspective view of a self-retaining locator member, according to an embodiment of the disclosure.
Figure 2:
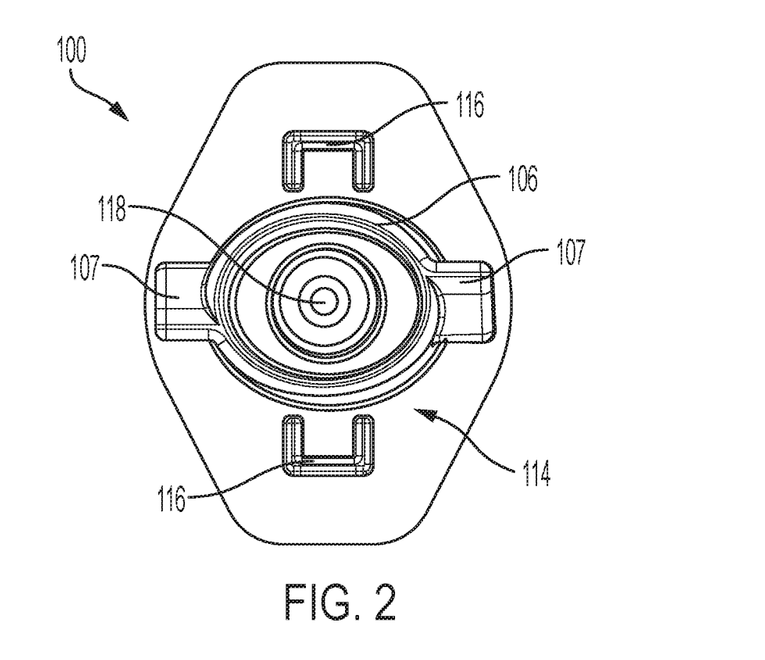
FIG. 2 schematically illustrates a bottom view of the self-retaining locator member of FIG. 1, according to an embodiment of the disclosure.
Figure 3:
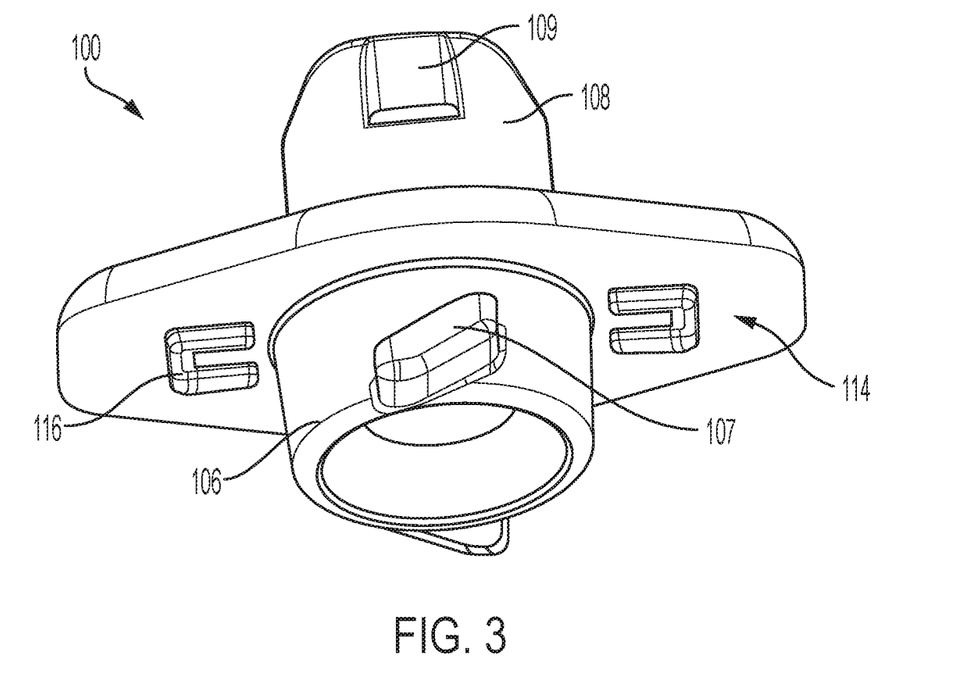
FIG. 3 schematically illustrates a bottom perspective view of the self-retaining locator member of FIG. 1, according to an embodiment of the disclosure.

FIGS. 1-3 illustrate a self-retaining locator member 100, according to an embodiment of the disclosure. The locator member 100 includes a body 102 having a first side surface 104 and a second side surface 114 opposite or underneath the first side surface 104. In various embodiments, the first and second side surfaces 104, 114 form the body 102, elongated along a longitudinal axis, as best shown in FIG. 3.

The body 102 also includes at least one alignment member 108 extending from the first side surface 104. As shown in FIGS. 1 and 3, the locator member 100 includes two alignment members 108; however, other embodiments include more or fewer alignment members 108. Each alignment member 108 includes a retention tab 109. The retention tab 109 engages with a surface of the component configured to attach to the locator member 100, as illustrated in greater detail herein. In various embodiments, each of the alignment members 108 is a semi-circular or curved member.

The first side surface 104 also includes an edge 110 defining an engagement area 112. In various embodiments, the engagement area 112 is configured to receive a tool, such as a screwdriver, for example and without limitation. Engagement of the tool with the engagement area 113 enables rotation of the body 102 within an aperture as discussed in greater detail with respect to FIG. 5. In various embodiments, as shown in FIG. 1, the alignment members 108 at least partially encircle the engagement area 112.

A lip 105 extends around at least a portion of the first side surface 104. In various embodiments, the lip 105 encircles the first side surface 104. In various embodiments, the lip 105 is an angled surface extending around the circumference of the body 102. The lip 105 is adjacent to both the first side surface 104 and the second side surface 114 and connects the first and second side surfaces 104, 114.

An extension member 106 extends from the second side surface 114. The extension member 106 is, in some embodiments, as shown in FIGS. 2 and 3, a cylindrical extension surrounding the engagement area 112 located on the opposite, or first side surface 104, of the body 102. In various embodiments, a retention member 107 extends from the exterior surface of the extension member 106. As shown in FIGS. 1-3, two retention members 107 extend from opposite sides of the extension member 106. In various embodiments, the retention members 107 are rectangular extensions oriented at an oblique angle with respect to the second side surface 114, that is, one end of each of the retention members 107 is closer to the second side surface 114 than the other, opposite end of the retention member 107. Both of the retention members 107 are separated from the second side surface 114 of the body 102 such that, when the locator member 100 is inserted into an aperture in a vehicle frame, rotation of the body 102 results in engagement between the vehicle frame and the retention members 107 and elastic deformation of the body 102 to an elastically averaged final configuration. In other words, each of the retention members 107 is shaped like a ramp that engages with the aperture in a vehicle frame and adjusts the alignment of the locator member 100 within the aperture in the vehicle frame.

In various embodiments, a stopping member 116 extends from the second side surface 114. As shown in FIG. 2, two stopping members 116 extend from the second side surface 114 and are located on opposite sides of the extension member 106. In various embodiments, as shown in FIG. 2, the stopping members 116 and the retention members 107 are oriented around the extension member 106 at ninety (90) degree intervals. In various embodiments, the stopping members 116 are oriented on the elongated sides of the body 102. In various embodiments, the stopping members 116 are raised, U-shaped members.

Figure 4:
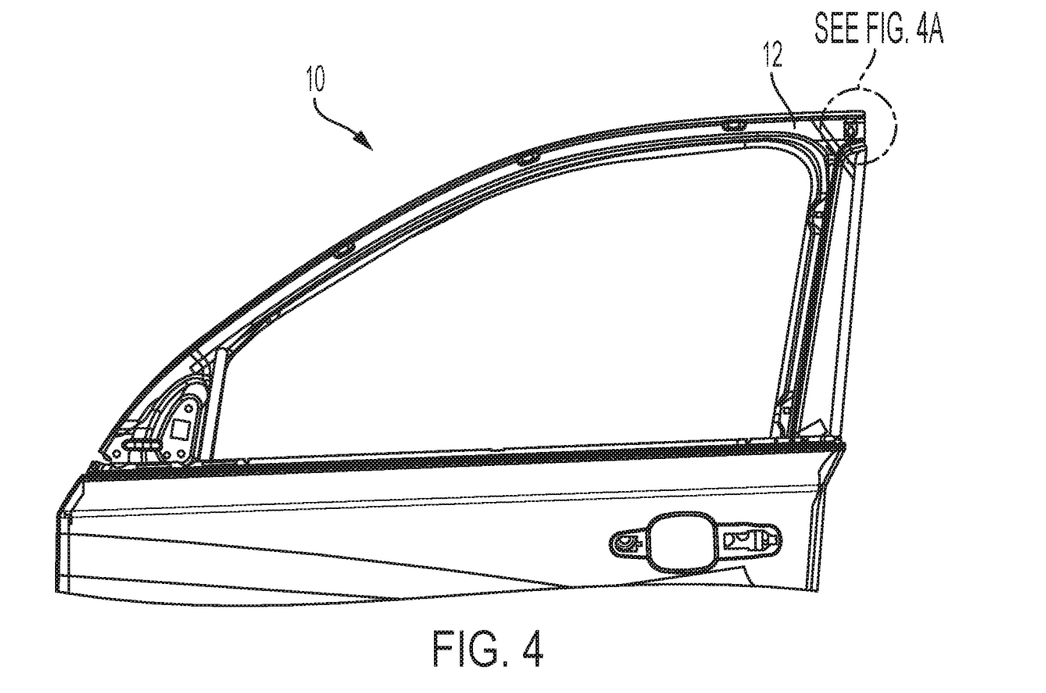
FIG. 4 schematically illustrates a vehicle including an aperture configured to receive a self-retaining locator member, according to an embodiment of the disclosure.

The self-retaining locator member 100 shown in FIGS. 1-3 is used, in some embodiments, in a door trim assembly application, as shown in FIGS. 4-8. With reference to FIG. 4, a vehicle 10 includes a frame 12 that, in some embodiments, is a door frame. The door frame 12 includes an attachment component 150. In various embodiments, the attachment component 150 is integral with the door frame 12. In other embodiments, the attachment component 150 is separate from, and installed into, an opening in the door frame 12.

Figure 4A:
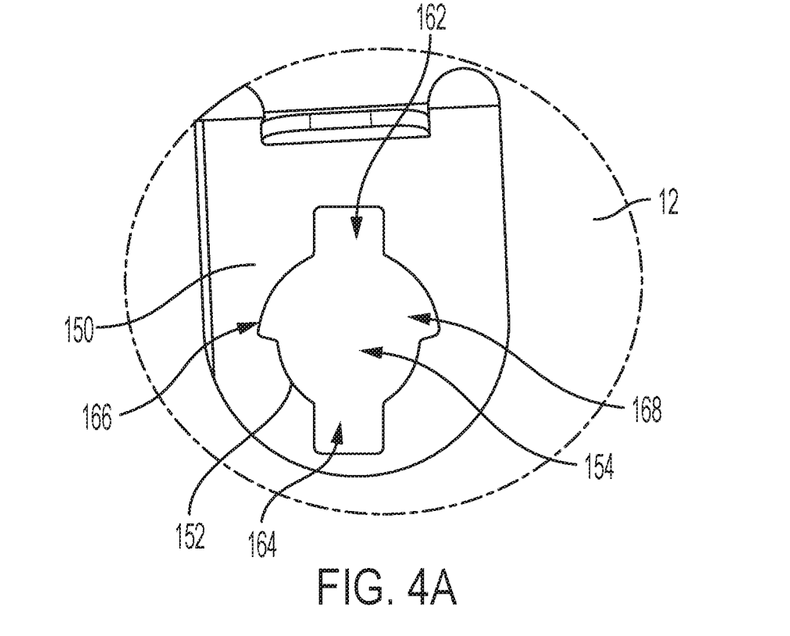
FIG. 4A is a detailed view of an area of the vehicle shown in FIG. 4.

The attachment component includes an edge 152 that defines an opening 154 configured to receive the locator member 100. In various embodiments, the opening 154 includes a first retention member opening 162 and a second retention member opening 164. The first and second retention member openings 162, 164 are oriented on opposite ends of the opening 154 and are configured to receive the retention members 107 of the locator member 100 as the locator member 100 is inserted into the opening 154. The edge 152 also defines two tab openings 166, 168. The tab openings 166, 168 are configured to engage with the retention members 107 as the locator member 100 is rotated within the opening 154. Engagement of the retention members 107 with the tab openings 166, 168 limit or stop further rotation of the locator member 100 within the opening 154.

Figure 5A:
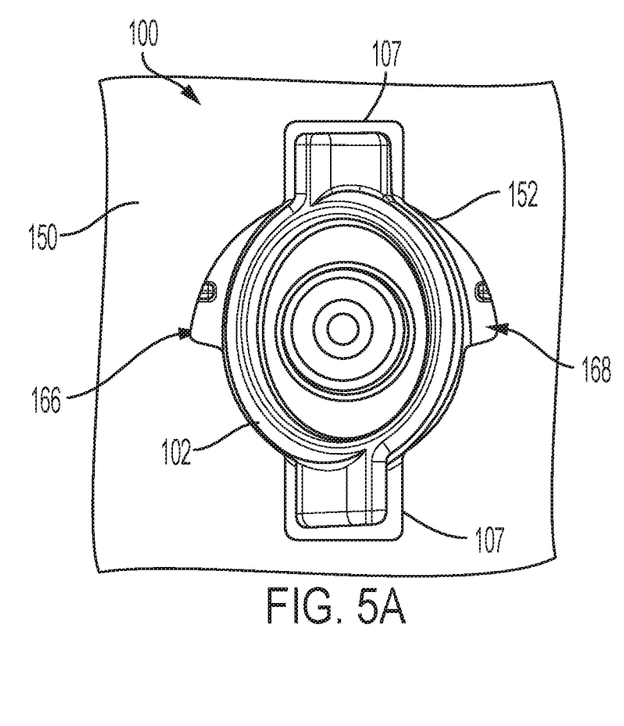
FIG. 5A schematically illustrates an underside view of an initial position of a self-retaining locator member within an aperture, according to an embodiment of the disclosure.
Figure 5B:
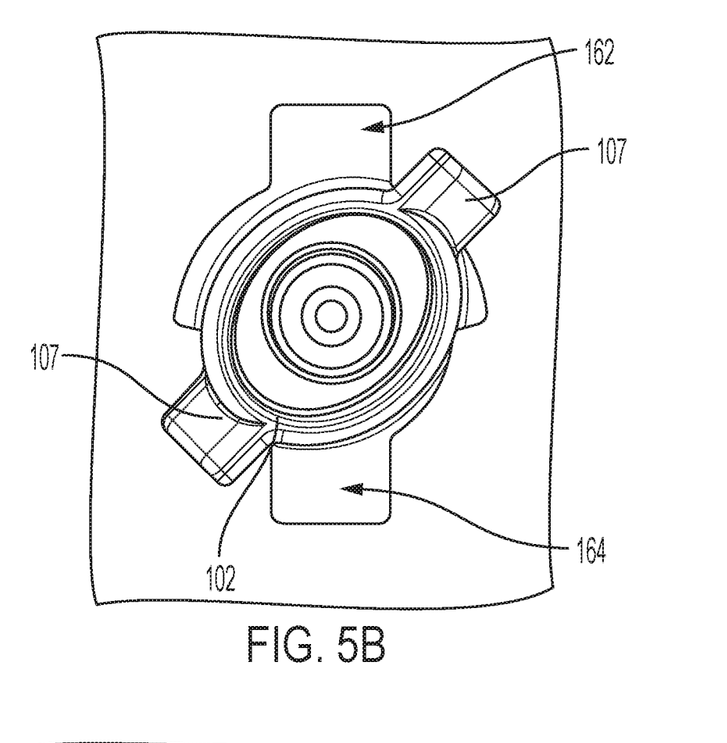
FIG. 5B schematically illustrates an underside view of a rotated position of a self-retaining locator member within an aperture, according to an embodiment of the disclosure.
Figure 5C:
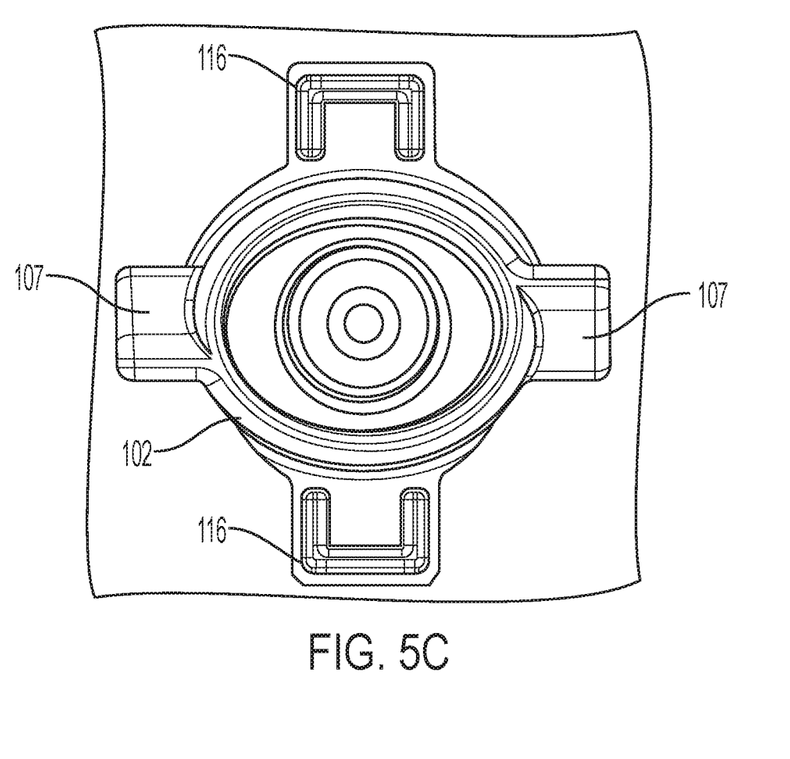
FIG. 5C schematically illustrates an underside view of a final rotated position of a self-retaining locator member within an aperture, according to an embodiment of the disclosure.
Figure 5D:
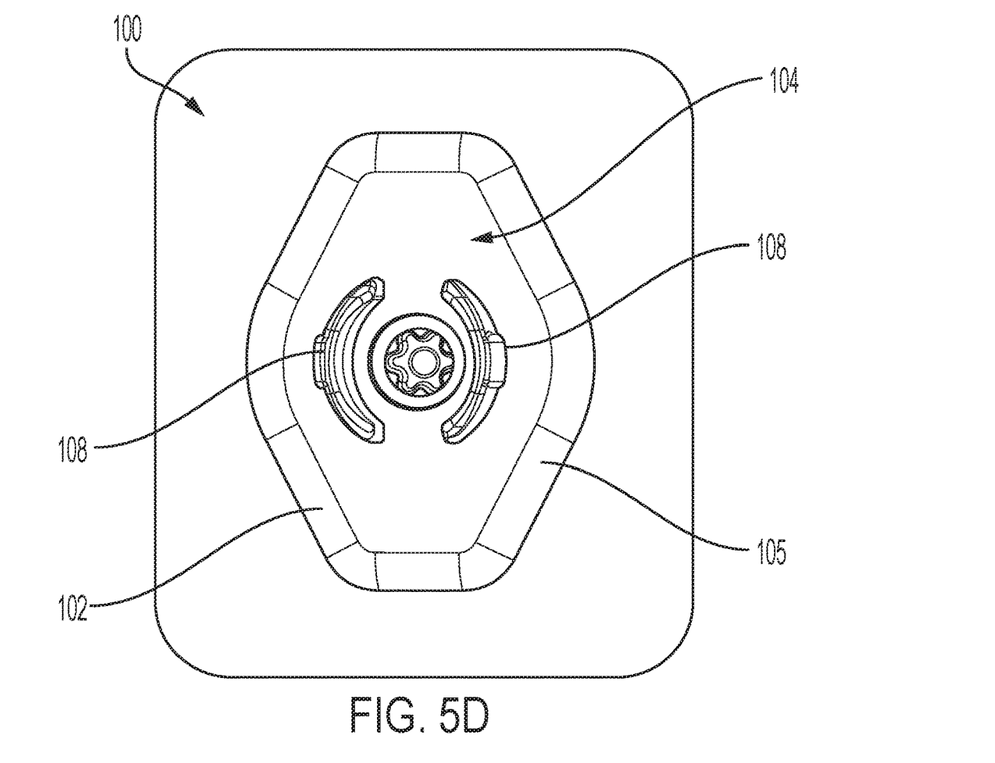
FIG. 5D schematically illustrates a top view of a final rotated position of a self-retaining locator member within an aperture, according to an embodiment of the disclosure.

FIGS. 5A-5D illustrate the locator member 100 in various stages of insertion and rotation within the opening 154 in the attachment component or vehicle frame 12, with FIGS. 5A-5C illustrating the underside or second side surface 114 of the locator member 100 and FIG. 5D illustrating the top, connecting, or first side surface 104 of the locator member 100 in the rotated and installed position.

FIG. 5A illustrates the locator member 100 in a first, or insertion, position within the opening 154. As shown in FIG. 5A, the retention members 107 are aligned with the retention member openings 162, 164 as the locator member 100 is inserted into the opening 154 defined by the edge 152. FIG. 5B illustrates clockwise rotation of the locator member 100 within the opening 154. Rotation of the locator member 100 within the opening 154 facilitates deformation of the body 102 from the first position to a second, or installed position. In the second, or installed position, the body 102 is an elastically averaged final configuration. As the locator member 100 is rotated further within the opening 154, the locator member 100 reaches the second, or installed, position shown in FIG. 5C. In this position, the retention members 107 abut against or engage with the tab openings 166, 168. Additionally, the stopping members 116 engage with the retention members openings 162, 164. As shown in FIG. 5D, the installed locator member 100 is retained or locked within the opening in the vehicle frame with the alignment members 108 configured to engage with a mating component, such as a component of a door trim assembly, for example and without limitation.

Figure 6:
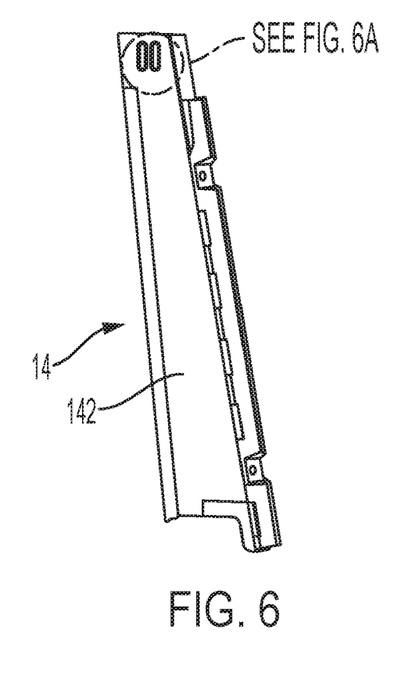
FIG. 6 schematically illustrates a vehicle component including a plurality of apertures configured to engage with a self-retaining locator member, according to an embodiment of the disclosure.
Figure 6A:
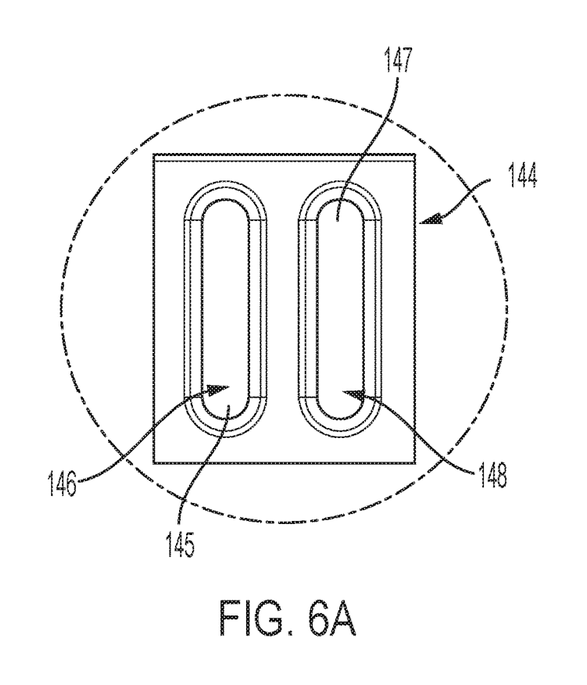
FIG. 6A is a detailed view of an area of the vehicle shown in FIG. 4.
Figure 7:
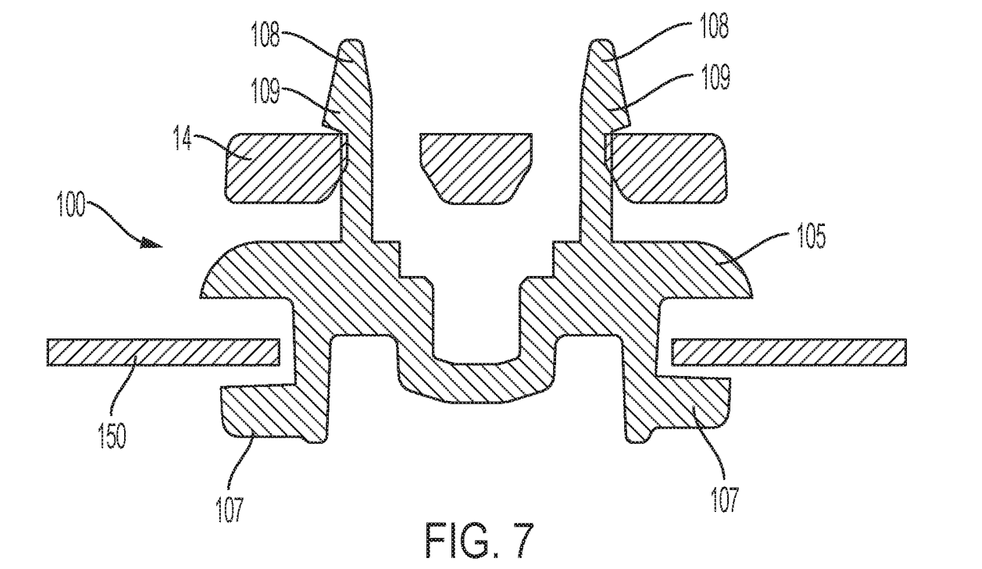
FIG. 7 schematically illustrates a cross-sectional view of a vehicle component coupled to a vehicle frame via a self-retaining locator member, according to an embodiment of the disclosure.
Figure 8:
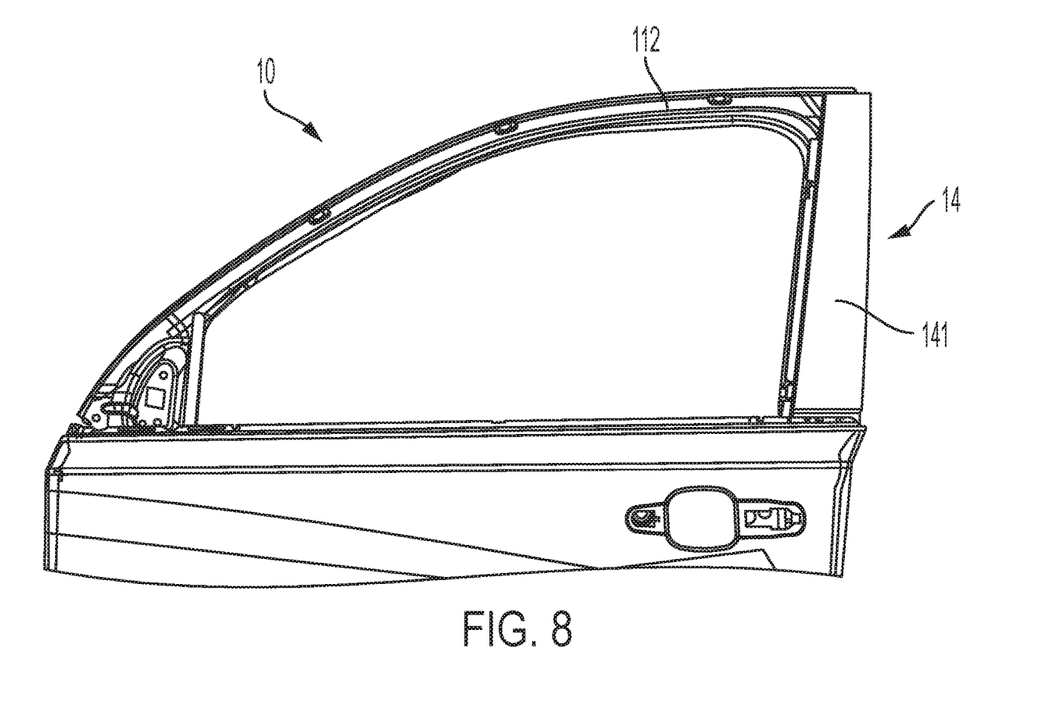
FIG. 8 schematically illustrates a component coupled to a vehicle via a self-retaining locator member, according to an embodiment of the disclosure.

FIGS. 6-8 illustrate the attachment of a component 14 to the locator member 100. With reference to FIG. 6, the component 14 is a component of a door trim assembly and has an underside surface 142. A mating region 144 on the underside surface 142 is configured to engage with the locator member 100. The mating region 144 includes a first edge 145 defining a first slotted opening 146 and a second edge 147 defining a second slotted opening 148, as shown in the detailed FIG. 6A.

The cross-sectional view shown in FIG. 7 illustrates the engagement of the locator member 100 with the mating region 144 of the component 14. The locator member 100 is inserted and locked into the opening in the attachment component 150 of the vehicle frame 12. As shown, the lip 105 and retention members 107 "sandwich" or engage with the edge of the opening in the attachment component 150. The alignment members 108 extend within the first and second slotted openings 146, 148 in the component 14 such that the retention tab 109 engages with the edges 145, 147 of the slotted openings 146, 148 to couple the component 14 to the locator member 100 using elastic averaging.

Each elastically deformable alignment member 108 is configured and disposed to interferingly, deformably, and matingly engage with the slotted openings 146, 148, as discussed herein in more detail, to precisely align the component 14 with the frame 12 in two directions, such as the +/−x-direction, the +/−y-direction, and the +/−z-direction of an orthogonal coordinate system, for example, which is herein referred to as two-way alignment. The locator member 100 also facilitates a stiff and rigid connection between the component 14 and the frame 12, thereby reducing or preventing relative movement therebetween.

The locator member 100 provides a dimensionally controlled interface between the sheet metal of the vehicle frame 12 and the component 14. The final assembly of the component 14 coupled to the frame 12 of the vehicle 10 is shown in FIG. 8. The coupling of the component 14 to the frame 12 via the locator member 100 presents a clean, outward surface 141.

An exemplary method of manufacturing the locator member 100 includes the steps of forming the body 102 including forming the engagement area 112 in the first surface 104, forming the first and second alignment members 108 to extend from the first surface, and forming each of the first and second alignment members 108 to include a retention tabs 109. The method also includes forming the extension member 106 extending from the second surface 114, forming the retention member 107 extending from the extension member 106; and forming the stopping member 116 extending from the second surface 114. As noted herein, rotation of the locator member 100 facilitates deformation of the body 102 as the body 102 rotates from the first position to the second position. Furthermore, rotation of the body 102 from the first position to the second position results in elastic deformation of the body to an elastically averaged final configuration.

While the embodiments discussed herein are illustrated as part of a door trim assembly, it is understood that the locator member 100 may be used to couple any two components together using elastic averaging to achieve a rigid, precise, and serviceable alignment between components.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context dearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives and is not intended to limit the selection to only those listed alternatives or to only one of the listed alternatives at a time, unless the context clearly indicates otherwise.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A self-retaining locator member, comprising:
    a body having a first surface and a second surface opposite the first surface, the body including
    an engagement area formed in the first surface;
    a first curved alignment member extending from the first surface and a second curved alignment member extending from the first surface, each of the first and second alignment members including a retention tab, the first and second curved alignment members at least partially encircling the engagement area;
    an extension member extending from the second surface;
    a first retention member extending from the extension member on a first side
    and a second retention member extending from the extension member on a second side opposite the first side; and
    a first stopping member extending from the second surface and a second stopping member extending from the second surface, the first and second stopping members located on opposite sides of the extension member;
    wherein the first and second stopping members and the first and second retention members are evenly distributed around the extension member.

2. The self-retaining locator member of claim 1, wherein the body is elongated along a longitudinal axis.

3. The self-retaining locator member of claim 1, wherein the first and second surfaces of the body are connected by and adjacent to an angled surface defining a lip.

4. The self-retaining locator member of claim 1, wherein the engagement area is configured to receive a tool adapted to rotate the self-retaining locator member.

5. The self-retaining locator member of claim 4, wherein rotation of the self-retaining locator member facilitates deformation of the body as the body rotates from a first position to a second position.

6. The self-retaining locator member of claim 5, wherein the first position is an insertion position and the second position is an installed position.

7. The self-retaining locator member of claim 1, wherein the first and second retention members are rectangular extensions oriented at an oblique angle with respect to the second surface of the body such that one end of each of the first and second retention members is closer to the second surface of the body than the other, opposite end of each of the first and second retention members.

8. The self-retaining locator member of claim 1, wherein the extension member is a cylindrical extension and the first and second retention members extend from an exterior surface of the extension member such that each of the first and second retention members is spaced apart from the second surface.

9. The self-retaining locator member of claim 1, wherein the first and second stopping members are raised, U-shaped members.

10. An automotive vehicle, comprising:
a frame including an aperture;
a self-retaining locator member arranged in the aperture, the self-retaining locator member including a body defining a longitudinal axis and comprising a first curved alignment member and a second curved alignment member spaced apart from each other, each of the first and second curved alignment members including a retention tab; and
a vehicle component comprising a first edge defining a first opening configured to receive and engage the first alignment member and a second edge defining a second opening configured to receive and engage the second alignment member to couple together the vehicle component and the self-retaining locator member;
wherein each of the first and second curved alignment members is an elastically deformable material such that when the vehicle component is coupled to the self-retaining locator member, the first and second curved alignment members elastically deform to facilitate alignment of the vehicle component and the frame in a desired orientation.

11. The automotive vehicle of claim 10, wherein the body of the self-retaining locator member includes a first surface and a second surface opposite the first surface, the first and second curved alignment members extending from the first surface of the body; an extension member extending from the second surface; a first retention member extending from the extension member on a first side and a second retention member extending from the extension member on a second side opposite the first side; and a first stopping member extending from the second surface and a second stopping member extending from the second surface, the first and second stopping members located on opposite sides of the extension member.

12. The automotive vehicle of claim 11, wherein the body is elongated along the longitudinal axis and the first and second surfaces of the body are connected by and adjacent to an angled surface defining a lip.

13. The automotive vehicle of claim 10, wherein rotation of the self-retaining locator member within the aperture of the frame facilitates deformation of the body from a first position to a second position, wherein the first position is an insertion position and the second position is an installed position.

14. The automotive vehicle of claim 11, wherein the first and second retention members are rectangular extensions oriented at an oblique angle with respect to the second surface of the body such that one end of each of the first and second retention members is closer to the second surface of the body than the other, opposite end of each of the first and second retention members and the first and second retention members are spaced apart from the second surface of the body.

15. The automotive vehicle of claim 11, wherein the first and second stopping members are raised, U-shaped members.

16. A method of manufacturing a self-retaining locator member, the method comprising:
forming a body having a first surface and a second surface opposite the first surface, the body including an engagement area formed in the first surface;
forming a first curved alignment member extending from the first surface and a second curved alignment member extending from the first surface, each of the first and second curved alignment members including a retention tab, the first and second curved alignment members at least partially encircling the engagement area;
forming an extension member extending from the second surface;
forming a retention member extending from the extension member; and
forming a stopping member extending from the second surface.

17. The method of claim 16, wherein rotation of the self-retaining locator member facilitates deformation of the body as the body rotates from a first position to a second position.

18. The method of claim 17, wherein rotation of the body from the first position to the second position results in elastic deformation of the body to an elastically averaged final configuration.

* * * * *